Oct. 17, 1950  H. F. VICKERS  2,525,979
FLUID ENERGY TRANSLATING DEVICE
Filed Jan. 18, 1946  2 Sheets-Sheet 1

INVENTOR.
Harry F. Vickers
BY Ralph L. Tweedale
ATTORNEY

Oct. 17, 1950     H. F. VICKERS     2,525,979
FLUID ENERGY TRANSLATING DEVICE

Filed Jan. 18, 1946     2 Sheets-Sheet 2

INVENTOR
HARRY F. VICKERS
By Ralph L. Tweedale
ATTORNEY

Patented Oct. 17, 1950

2,525,979

UNITED STATES PATENT OFFICE 2,525,979

FLUID ENERGY TRANSLATING DEVICE

Harry F. Vickers, Detroit, Mich., assignor to Vickers Incorporated, Detroit, Mich., a corporation of Michigan Application January 18, 1946, Serial No. 642,015

15 Claims. (Cl. 103—162)

This invention relates to power transmissions, particularly to those of the type comprising two or more fluid pressure energy translating devices, one of which may function as a pump and another as a fluid motor.

The present invention is particularly concerned with fluid pressure energy translating devices of the fixed or variable displacement type and is particularly applicable to those of the class wherein the load forces generated by fluid pressure within the device are carried by the drive shaft and casing largely in the axial direction with respect to the shaft. In devices of this general character, the axial thrust loads are substantially in direct proportion to the fluid pressure at which the device operates. The present tendency in the art is toward increasingly higher pressures which naturally imposes greater and greater loads on the thrust bearings of the device.

The main object of the present invention is to provide an improved pump or motor construction having a greatly increased thrust bearing capacity at all speeds and permitting operation at higher pressures and speeds than heretofore have been possible.

It is also an object to provide a pump or motor of improved and more rugged, compact and reliable construction capable of satisfactory operation over a long useful life at extremely high pressures and high speeds.

Further objects and advantages of the present invention will be apparent from the following description, reference being had to the accompanying drawings wherein a preferred form of the present invention is clearly shown.

Figure 1:
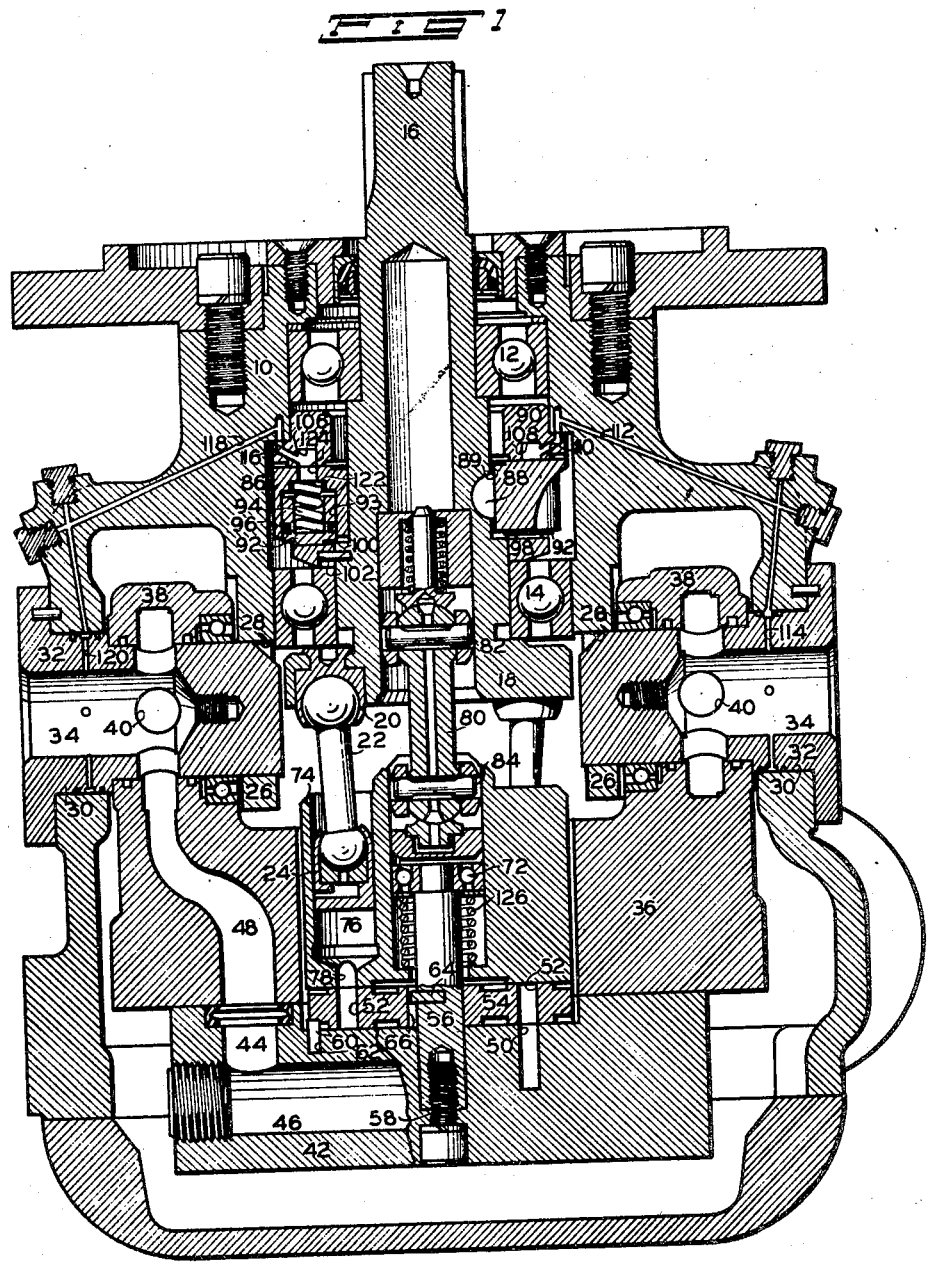
Figure 1 is an elevational view of a pump in section along its axis and incorporating a preferred form of the invention.
Figure 2:
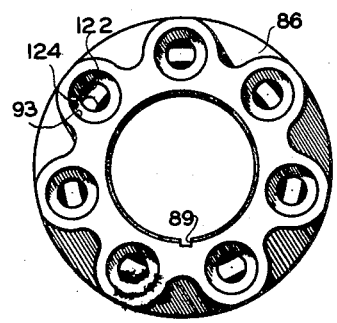
Figures 2 and 3 are bottom and top plan views, respectively, showing the bearing cylinder block.
Figure 3:
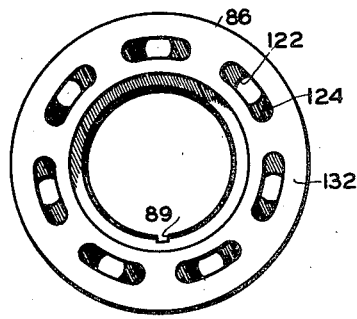
Figure 4:
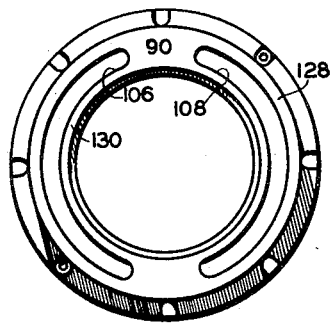
Figure 4 is a bottom plan view of the bearing valve plate.
Figure 5:
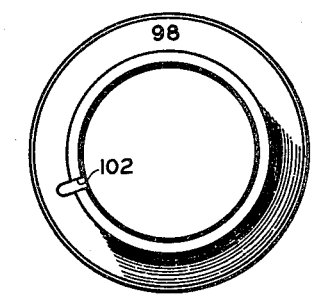
Figure 5 is a top plan view of the bearing thrust plate.

In detail the pump comprises generally a main stationary frame member 10 provided with radial bearings 12 and 14 in which a rotary driving member or main shaft 16 is journalled. The shaft 16 is provided with a socket flange 18 carrying a plurality of ball sockets 20 in which are mounted ball-ended connecting rods 22 carrying a selected number of reciprocating pistons 24. The casing member 10 is provided with two inwardly projecting tongues 26 having bores 28 in alignment with similar bores 30 formed in the side walls of the main casing member. Positioned in the bores 30 are hollow trunnions 32 which communicate with discharge and inlet ports 34.

Journalled on the trunnions 32, intermediate the side walls of the casing and the tongues 26, is a yoke 36 having hollow arms 38 which communicate with the interior bore of the trunnions 32 through radial passages 40. The yoke 36 is formed by securing two arms 38 to a valve supporting plate 42 having internal passages 44 and 46 which communicate with the internal passages 48 in the hollow arms 38 of yoke 36. The passages 44 and 46 lead to a pair of arcuate ports 50 in the valve supporting plate 42.

Adjacent the upper face of the valve supporting plate 42 is the main valve or wear plate 54 having two arcuate ports 52 registering with the ports 50 in supporting plate 42 and forming exhaust and inlet port communications to a cylinder block 74. The valve plate 54 is mounted upon a stationary shaft 56 which is rigidly secured to the supporting plate 42 by bolt 58. Valve plate 54 is provided with a dowel 60 which fits into dowel hole 62 of plate 42. The plate 54 is thus maintained against angular displacement with respect to plate 42 but is free to move in an axial direction toward and away from plate 42. A pin 64 in shaft 56 is slidably mounted in a keyway 66 which is formed on the valve plate 54.

A rotary pumping or propelling mechanism is journalled on a ball bearing 72 carried by shaft 56 and includes a cylinder barrel 74 having an odd number of cylinders 76 in which the pistons 24 are axially reciprocable. Each cylinder is provided with a cylinder port 78 adapted to register alternately with the arcuate inlet or exhaust ports 52 as the cylinder barrel 76 is rotated. The pump barrel 74 for this purpose is driven from the main shaft 16 through the medium of a Cardan shaft 80 and universal joints 82 and 84.

An axial thrust bearing positioned between radial bearings 12 and 14 is provided for transmitting the thrust set up by the rotary pumping or propelling mechanism to the main frame 10. The axial thrust bearing includes a bearing cylinder block 86 adapted to rotate in unison with shaft 16. A key 88 maintains block 86 against angular displacement with respect to shaft 16 but permits key 88 to move axially in keyway 89. Therefore, block 86 is free to move axially toward and away from a thrust bearing valve plate 90 which is fixed to the stationary frame member 10. A series of bearing pistons 92 are located in bores 93 in block 86. The same number of bearing pistons 92 are preferred as are employed in the cylinder barrel 74, and as a rule, an odd number such as seven in this case are preferred.

Theoretically, the pumping or propelling pistons 24 and the bearing pistons 92 set up opposing and balanced thrust forces. The bearing pistons 92 are preloaded by a spring 94 and are provided with a hydraulic seal 96 located in the cylinder walls or bores 93 to prevent leakage between the piston 92 and the cylinder block 86. A thrust plate 98, resting on the inner race of bearing 14, is maintained against angular movement with respect to the shaft 16 by means of the pin 100 in slot 102.

The bearing valve plate 90 is provided with two arcuate ports 106 and 108 similar to ports 52 in the pump valve plate 54. Each of the ports 108 and 106 are connected to the combination pressure and exhaust ports 34 by means of the three conduits 110, 112, 114 and 116, 118, 120, respectively, and are subject to the same variable fluid pressures as arcuate ports 52 in the valve plate 54. The bearing cylinder bore 93 communicates with the arcuate ports 106 and 108 of bearing valve plate 90 through bores 122 and arcuate slots 124 in block 86. Therefore, bearing cylinder bores 93 and pump cylinder bores 76 are each connected to pressure and exhaust ports 34 and subjected to the same pressure changes. By providing a bearing cylinder block 86 of equivalent sectional areas to that of the pump cylinder barrel 74, the opposed axial thrusts will be theoretically equal.

In operation, the device illustrated functions as a pump in the manner well known to the art. At high pressures and speeds the rotary driving member 16 is subject to a heavy axial thrust load. The load is produced by hydraulic pressure against the pistons 24 and communicated to the shaft 16 through connecting rods 22, ball sockets 20 and flange 18. Further, the axial thrust is not uniform on all sockets 20 at any one time merely because of the fact that part of the pistons 24 are under pressure while the balance are under suction. Therefore, one of the objects of this invention is to provide an axial thrust bearing capable of setting up forces opposed to and varying in intensity and in proportion to the variable thrust loads on the pistons 24.

The aforesaid thrust, set up by the pistons 24 and carried to the shaft 16 and the main frame 10, also sets up an equal and opposite force in the cylinder barrel 74 and valve plate 54, which in turn is carried to the case or main frame member 10 through the yoke 36 and trunnions 32. Actually, the thrust set up by pistons 24 is transmitted almost entirely to the valve plate 54 by means of hydraulic fluid pressure. The force of the spring 126 is sufficient to maintain the barrel 74 in contact with valve plate 54 during low hydraulic pressure. In other words, the ports and lands of the cylinder block 74 and valve plate 54 are so proportioned that only a very small percentage (normally about four percent) of the entire piston thrust acts on the cylinder block 74 to hold it in rotative engagement with valve plate 54. For that reason, an oil film is readily maintained between the bearing surfaces of block 74 and plate 54 and consequently the entire axial thrust of the pistons is carried by the hydraulic fluid through the ports 78 and 52 and by said oil film between the bearing surfaces.

In practice, this rotary valve design is well known for its efficiency mainly from a porting standpoint. One of the objects of this invention is to employ its efficient bearing characteristics to provide means for adapting the thrust principle of the cylinder block valve plate design for balancing the axial thrust in the shaft. Therefore, the bearing cylinder block 86 is theoretically of the same design as the pump cylinder block 74 with the exception of the length of the cylinder bores 93 and 76, the latter being longer in order to accommodate the length of stroke of pump piston 24. An oil film is maintained between the lands 128 and 130 of the bearing valve plate 90, and the lands 132 of the bearing cylinder block 86.

The cross sectional areas of the pistons control the degree of thrust produced; consequently, as the yoke 36 swings in operation, the component of force producing axial thrust on the shaft 16 will vary correspondingly at any pressure and speed of the pump, and the most desirable counter-thrust may be calculated and the piston area of the thrust bearing limited to produce the desired thrust. A mechanical radial-thrust bearing can be employed in combination with the hydraulic thrust bearing if desirable and in fact in the construction illustrated, the bearing 12 is capable of carrying some thrust load.

It will thus be seen that the present invention provides an improved pump or motor construction in which the hydraulic pressure developed in the device is utilized to support thrust loads on the main shaft thus permitting smaller anti-friction bearings to be utilized. In addition, the use of hydraulic pressure fluid acting over a controlled area serves to maintain a predetermined balance between the active and reactive thrust forces as the operating pressure changes, thus making the use of a plain bearing practical at all loads.

While the form of embodiment of the invention as herein disclosed constitutes a preferred form, it is to be understood that other forms might be adopted, all coming within the scope of the claims which follow.

What is claimed is as follows:

1. In a pump or motor device the combination of a stationary frame member and a rotary driving member and a pumping or propelling mechanism including a cylinder barrel provided with a number of cylinders and pistons parallel to its axis, a valve plate in bearing contact with the head of said cylinder barrel and connected to the fluid pressure and return lines for porting said cylinders and absorbing the axial thrust of said cylinder barrel, said pumping mechanism being of a type which produces an axial thrust between said members which is a function of the operating pressure of the device, and a hydraulically operated axial thrust bearing having fluid communication with the pumping mechanism and having contact surfaces of substantially the same area as the contact surfaces of the cylinder barrel and valve plate of the pumping mechanism and having cylinders and pistons between the stationary frame member and the rotary driving member substantially equal in number and area to the number and area, respectively, of the pumping cylinders for providing a bearing force opposed to said axial thrust between the members and proportional to the operating pressure of the device.

2. In a pump or motor device the combination of a stationary frame member and a rotary driving member and a pumping or propelling mechanism of a type which produces an axial thrust between said members which is a function of the operating pressure of the device, and a hydraulically operated axial thrust bearing having fluid communication with the pumping mechanism and including a cylinder block provided with a number of cylinders and pistons parallel to its axis, a bearing valve plate in rotary bearing contact with said cylinder block, said cylinder block and bearing valve plate being provided with port and land areas so proportioned that only a small percentage of the entire piston thrust acts on the bearing cylinder block thereby exerting only sufficient force for holding said cylinder block in rotative engagement with its valve plate for providing a bearing force opposed to said axial thrust between the members and proportional to the operating pressure of the device.

3. In a pump or motor device the combination of a stationary frame member and a rotary driving member and a pumping or propelling mechanism of a type which produces an axial thrust between said members which is a function of the operating pressure of the device, and a hydraulically operated axial thrust bearing having fluid communication with the pumping mechanism and including a cylinder block provided with a number of cylinders and pistons parallel to its axis, a bearing valve plate in rotary bearing contact with said cylinder block, an oil film maintained between the bearing surfaces of the cylinder block and valve plate, said cylinder block and bearing valve plate being provided with port and land areas so proportioned that only a small percentage of the entire piston thrust acts on the bearing cylinder block thereby exerting only sufficient force for holding said cylinder block in rotative engagement with its valve plate without displacing said oil film for providing a bearing force opposed to said axial thrust between the members and proportional to the operating pressure of the device.

4. In a pump or motor device the combination of a stationary frame member and a rotary driving member and a pumping or propelling mechanism of a type which produces an axial thrust between said members which is a function of the operating pressure of the device, and a hydraulically operated axial thrust bearing having fluid communication with the pumping mechanism and including a cylinder block provided with a number of cylinders and pistons parallel to its axis, a bearing valve plate in rotary bearing contact with said cylinder block, an oil film maintained between the bearing surfaces of the cylinder block and valve plate, said cylinder block and bearing valve plate being provided with port and land areas so proportioned that only a small percentage of the entire piston thrust acts on the bearing cylinder block and the balance is carried directly by the hydraulic fluid pressure to the valve plate, said small percentage acting on the cylinder block thereby exerting only sufficient force for holding said cylinder block in rotative engagement with its valve plate without displacing said oil film for providing a bearing force opposed to said axial thrust between the members and proportional to the operating pressure of the device.

5. In a pump or motor device the combination of a stationary frame member and a rotary driving member and a pumping or propelling mechanism including a cylinder barrel provided with a number of cylinders and pistons parallel to its axis, a valve plate in bearing contact with the head of said cylinder barrel and connected to the fluid pressure and return lines for porting said cylinders and absorbing the axial thrust of said cylinder barrel, said cylinder barrel and valve plate being provided with port and land areas so proportioned that only a small percentage of the entire piston thrust acts on the cylinder block thereby exerting sufficient force for holding said cylinder block in rotative engagement with its valve plate, said pumping mechanism being of a type which produces an axial thrust between said members which is a function of the operating pressure of the device, and a hydraulically operated axial thrust bearing having fluid communication with the pumping mechanism and having contact surfaces of substantially the same area as the contact surfaces of the cylinder barrel and valve plate of the pumping mechanism, and having cylinders and pistons between the stationary frame member and the rotary driving member substantially equal in number and area to the number and area, respectively, of the pumping cylinders for providing a bearing force opposed to said axial thrust between the members and proportional to the operating pressure of the device.

6. In a pump or motor device the combination of a stationary frame member and a rotary driving member and a pumping or propelling mechanism including a cylinder barrel provided with a number of cylinders and pistons parallel to its axis, a valve plate in bearing contact with the head of said cylinder barrel and connected to the fluid pressure and return lines for porting said cylinders, and absorbing the axial thrust of said cylinder barrel, an oil film maintained between the bearing surfaces of the cylinder barrel and valve plate, said cylinder barrel and valve plate being provided with port and land areas so proportioned that only a small percentage of the entire piston thrust acts on the cylinder block thereby exerting sufficient force for holding said cylinder block in rotative engagement with its valve plate without displacing said oil film, said pumping mechanism being of a type which produces an axial thrust between said members which is a function of the operating pressure of the device, and a hydraulically operated axial thrust bearing having fluid communication with the pumping mechanism and having contact surfaces of substantially the same area as the contact surfaces of the cylinder barrel and valve plate of the pumping mechanism and having cylinders and pistons between the stationary frame member substantially equal in number and area to the number and area, respectively, of the pumping cylinders and a rotary driving member for providing a bearing force opposed to said axial thrust between the members and proportional to the operating pressure of the device.

7. In a pump or motor device the combination of a stationary frame member and a rotary driving member and a pumping or propelling mechanism including a cylinder barrel provided with a number of cylinders and pistons parallel to its axis, a valve plate in bearing contact with the head of said cylinder barrel and connected to the fluid pressure and return lines for porting said cylinders and absorbing the axial thrust of said cylinder barrel, an oil film maintained between the bearing surfaces of the cylinder barrel and valve plate, said cylinder barrel and valve plate being provided with port and land areas so proportioned that only a small percentage of the entire piston thrust acts on the cylinder block and the balance is carried directly by the hydraulic fluid pressure to the valve plate, said small percentage acting on the cylinder block thereby exerting sufficient force for holding said cylinder block in rotative engagement with its valve plate without displacing said oil film, said pumping mechanism being of a type which produces an axial thrust between said members which is a function of the operating pressure of the device, and a hydraulically operated axial thrust bearing having fluid communication with the pumping mechanism and having contact surfaces of substantially the same area as the contact surfaces of the cylinder barrel and valve plate of the pumping mechanism, and having cylinders and pistons between the stationary frame member substantially equal in number and area to the number and area, respectively, of the pumping cylinders and the rotary driving member for providing a bearing force opposed to said axial thrust between the members and proportional to the operating pressure of the device.

8. In a pump or motor device the combination of a stationary frame member and a rotary driving member and a pumping or propelling mechanism of a type which produces an axial thrust between said members which is a function of the operating pressure of the device, and a hydraulically operated axial thrust bearing having fluid communication with the pumping mechanism and including a bearing valve plate fixed to the stationary frame member, a bearing cylinder block keyed to the driving member for preventing angular displacement but permitting axial movement toward and away from said bearing valve plate, and pressure responsive means actuated and controlled by the operating pressure of the pumping or propelling mechanism for maintaining the bearing cylinder block in bearing contact with the said bearing valve plate and providing a bearing force opposed to said axial thrust between the members and proportional to the operating pressure of the device.

9. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve plate fixed to the stationary frame member, a bearing cylinder block keyed to the driving member for preventing angular displacement but permitting axial movement toward and away from said bearing valve plate, a thrust plate rotatively fixed to the driving member, a number of axial cylinders in said block, pistons in said cylinders and in contact at one end with said thrust plate, pressure passages selectively connecting the heads of the cylinders to the pressure and inlet ports of the pumping or propelling mechanism for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

10. In a pump or motor device the combination of a stationary frame member and a rotary driving member and a pumping or propelling mechanism provided with a selected number of axial cylinders of a type which produces an axial thrust between said members which is a function of the operating pressure of the device, and a hydraulically operated axial thrust bearing including a bearing valve plate fixed to the stationary frame member, a bearing cylinder block keyed to the driving member for preventing angular displacement but permitting axial movement toward and away from said bearing valve plate, a thrust plate rotatively fixed to the driving member, a number of axial cylinders in said block equal to the number selected for the pumping mechanism, pistons in said cylinders and in contact at one end with said thrust plate, pressure passages selectively connecting the heads of the cylinders to the pressure and inlet ports of the pumping or propelling mechanism for supplying fluid under pressure to said cylinders and depressing said pistons for providing a bearing force opposed to said axial thrust between the members and proportional to the operating pressure of the device.

11. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve plate fixed to the stationary frame member, a bearing cylinder block keyed to the driving member for preventing angular displacement but permitting axial movement toward and away from said bearing valve plate, a thrust plate rotatively fixed to the driving member, a number of axial cylinders in said block, pistons in said cylinders and in contact at one end with said thrust plate, arcuate ports in said valve plate connected to the pressure and inlet ports of the pumping or propelling mechanism, arcuate ports in the cylinder block connected to the cylinder bores and adapted to communicate with the arcuate ports of the valve plate during rotation of the cylinder block for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

12. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve plate fixed to the stationary frame member, a bearing cylinder block keyed to the driving member for preventing angular displacement but permitting axial movement toward and away from said bearing valve plate, an oil film maintained between the bearing surfaces of the cylinder block and bearing valve plate, a thrust plate rotatively fixed to the driving member, a number of axial cylinders in said block, pistons in said cylinders and in contact at one end with said thrust plate, arcuate ports in said valve plate connected to the pressure and inlet ports of the pumping or propelling mechanism, arcuate ports in the cylinder block connected to the cylinder bores and adapted to communicate with the arcuate ports of the valve plate during rotation of the cylinder block for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

13. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve plate fixed to the stationary frame member, a bearing cylinder block keyed to the driving member for preventing angular displacement but permitting axial movement toward and away from said bearing valve plate, the area of the external surface of the head of the cylinder block exposed to delivery pressure being slightly smaller than the cylinder area opposing it whereby the resultant force tends to urge the cylinder block toward the valve plate and retain the block and plate in bearing contact at all working pressures of the pumping mechanism, a thrust plate rotatively fixed to the driving member, a number of axial cylinders in said block, pistons in said cylinders and in contact at one end with said thrust plate, arcuate ports in said valve plate connected to the pressure and inlet ports of the pumping or propelling mechanism, arcuate ports in the cylinder block connected to the cylinder bores and adapted to communicate with the arcuate ports of the valve plate during rotation of the cylinder block for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

14. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve placed fixed to the stationary frame member, a bearing cylinder block keyed to the driving member for preventing angular displacement but permitting axial movement toward and away from said bearing valve plate, an oil film maintained between the bearing surfaces of the cylinder block and bearing valve plate, the area of the external surface of the head of the cylinder block exposed to delivery pressure being slightly smaller than the cylinder area opposing it whereby the resultant force tends to urge the cylinder block toward the valve plate and retain the block and plate in bearing contact at all working pressures of the pumping mechanism, a thrust plate rotatively fixed to the driving member, a number of axial cylinders in said block, pistons in said cylinders and in contact at one end with said thrust plate, arcuate ports in said valve plate connected to the pressure and inlet ports of the pumping or propelling mechanism, arcuate ports in the cylinder block connected to the cylinder bores and adapted to communicate with the arcuate ports of the valve plate during rotation of the cylinder block for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

15. In a pump or motor device the combination of a stationary frame member and a rotary driving member and a pumping or propelling mechanism of a type which produces an axial thrust between said members which is a function of the operating pressure of the device, and a hydraulically operated axial thrust bearing including a bearing valve plate fixed to the stationary frame member, a bearing cylinder blocked keyed to the driving member for preventing angular displacement but permitting axial movement toward and away from said bearing valve plate, an oil film maintained between the bearing surfaces of the cylinder block and bearing valve plate, the area of the external surface of the head of the cylinder block exposed to delivery pressure being slightly smaller than the cylinder area opposing it whereby the resultant force tends to urge the cylinder block toward the valve plate and retain the block and plate in bearing contact at all working pressures of the pumping mechanism without displacing said oil film, a thrust plate rotatively fixed to the driving member, a number of axial cylinders in said block, pistons in said cylinders and in contact at one end with said thrust plate, arcuate ports in said valve plate connected to the pressure and inlet ports of the pumping or propelling mechanism, arcuate ports in the cylinder block connected to the cylinder bores and adapted to communicate with the arcuate ports of the valve plate during rotation of the cylinder block for supplying fluid under pressure to said cylinders and depressing said pistons for maintaining the bearing cylinder block in bearing contact with the said bearing valve plate and providing a bearing force opposed to said axial thrust between the members and proportional to the operating pressure of the device.

HARRY F. VICKERS.

REFERENCES CITED

The following references are of record in the file of this patent:

UNITED STATES PATENTS

| Number | Name | Date |
|---|---|---|
| 1,274,391 | Davis | Aug. 6, 1918 |
| 2,114,076 | Golz | Apr. 12, 1938 |
| 2,146,133 | Tweedale | Feb. 7, 1939 |
| 2,277,570 | Vickers | Mar. 24, 1942 |
| 2,288,768 | Zimmerman | July 7, 1942 |
| 2,298,849 | Vickers | Oct. 13, 1942 |
| 2,313,407 | Vickers | Mar. 9, 1943 |

FOREIGN PATENTS

| Number | Country | Date |
|---|---|---|
| 527,359 | Great Britain | 1940 |

Certificate of Correction

Patent No. 2,525,979                                                        October 17, 1950

HARRY F. VICKERS

It is hereby certified that error appears in the printed specification of the above numbered patent requiring correction as follows:

Column 6, line 55, after the word "member" insert *and the rotary driving member*; line 58, strike out "and a rotary driving member"; column 7, line 21, strike out "and the rotary driving member" and insert the same after "member" in line 18, same column;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*